(12) United States Patent
Aburatani et al.

(10) Patent No.: US 11,183,708 B2
(45) Date of Patent: Nov. 23, 2021

(54) METHOD FOR PRODUCING SULFIDE SOLID ELECTROLYTE AND SULFUR-BASED MATERIAL

(71) Applicants: IDEMITSU KOSAN CO., LTD., Tokyo (JP); TOYOTA JIDOSHA KABUSHIKI KAISHA, Toyota (JP)

(72) Inventors: Ryo Aburatani, Ichihara (JP); Masahiro Iwahara, Ichihara (JP); Fumio Yamakawa, Ichihara (JP); Takuo Yanagi, Toyota (JP); Takumi Tanaka, Shizuoka (JP)

(73) Assignees: IDEMITSU KOSAN CO., LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 15/566,768

(22) PCT Filed: Apr. 13, 2016

(86) PCT No.: PCT/JP2016/061952
§ 371 (c)(1),
(2) Date: Oct. 16, 2017

(87) PCT Pub. No.: WO2016/167302
PCT Pub. Date: Oct. 20, 2016

(65) Prior Publication Data
US 2018/0138545 A1 May 17, 2018

(30) Foreign Application Priority Data
Apr. 17, 2015 (JP) .............................. JP2015-085342

(51) Int. Cl.
*H01M 10/0562* (2010.01)
*C03C 10/16* (2006.01)
(Continued)

(52) U.S. Cl.
CPC .......... *H01M 10/0562* (2013.01); *C03B 1/00* (2013.01); *C03C 3/323* (2013.01); *C03C 4/14* (2013.01);
(Continued)

(58) Field of Classification Search
CPC ..... H01M 10/0562; H01M 2300/0068; H01M 2300/0091
See application file for complete search history.

(56) References Cited

U.S. PATENT DOCUMENTS 8,518,585 B2 8/2013 Ota et al.
9,620,811 B2 4/2017 Kambara et al.
(Continued)

FOREIGN PATENT DOCUMENTS

JP 2012-48971 A 3/2012
JP 2013-201110 A 10/2013
(Continued)

OTHER PUBLICATIONS

S. Ujiie et al., "Preparation and Electrochemical Characterization of (100-x)(0.7Li2S0.3P2S5) xLiBr Glass-Ceramic Electrolytes", Mater Renew Sustain Energy, vol. 3 No. 18 (2014) pp. 1-8.
(Continued)

*Primary Examiner* — Imran Akram
(74) *Attorney, Agent, or Firm* — Millen, White, Zelano & Branigan, PC; Ryan Pool (57) ABSTRACT

Provided are a method for producing a sulfide solid electrolyte having a high Li ion conductivity, in which the production time can be greatly reduced, and a sulfur-based material that can be used in the production method for a sulfide solid electrolyte. The invention relates to a method for producing a sulfide solid electrolyte containing a lithium element, a sulfur element, a phosphorus element, an iodine element and a bromine element, which includes mixing and
(Continued)

grinding lithium sulfide and lithium bromide followed by adding phosphorus sulfide and lithium iodide thereto and reacting them, and relates to a sulfur-based material.

4 Claims, 1 Drawing Sheet

(51) Int. Cl.
    *C03C 4/14*         (2006.01)
    *C03B 1/00*         (2006.01)
    *H01M 10/052*      (2010.01)
    *C03C 3/32*         (2006.01)

(52) U.S. Cl.
    CPC ........... C03C 10/16 (2013.01); H01M 10/052 (2013.01); *C03B 2201/88* (2013.01); *C03C 2204/00* (2013.01); *H01M 2300/0068* (2013.01)

(56) References Cited

U.S. PATENT DOCUMENTS

| | | | |
|---|---|---|---|
| 9,680,179 B2 | 6/2017 | Tsuchida et al. | |
| 2004/0018141 A1* | 1/2004 | Ritchie | C01G 33/006 |
| | | | 423/511 |
| 2009/0087730 A1* | 4/2009 | Kondo | H01M 2/266 |
| | | | 429/161 |
| 2009/0142669 A1* | 6/2009 | Shinohara | H01M 10/0525 |
| | | | 429/320 |
| 2009/0159839 A1* | 6/2009 | Seino | H01M 10/0562 |
| | | | 252/182.1 |
| 2010/0200795 A1 | 8/2010 | Ota et al. | |
| 2013/0177821 A1 | 7/2013 | Tsuchida et al. | |
| 2014/0127588 A1* | 5/2014 | Kato | H01M 4/625 |
| | | | 429/304 |
| 2014/0302382 A1 | 10/2014 | Kambara et al. | |
| 2015/0162614 A1* | 6/2015 | Koshika | H01M 4/38 |
| | | | 429/189 |
| 2015/0171464 A1 | 6/2015 | Kambara et al. | |
| 2016/0133989 A1 | 5/2016 | Suzuki et al. | |
| 2016/0149259 A1 | 5/2016 | Osada et al. | |
| 2016/0190638 A1* | 6/2016 | Sugiura | H01M 10/0562 |
| | | | 429/189 |
| 2017/0194662 A1 | 7/2017 | Kambara et al. | |

FOREIGN PATENT DOCUMENTS

| | | | |
|---|---|---|---|
| WO | 2009/047977 A1 | 4/2009 | |
| WO | 2014/010169 A1 | 1/2014 | |
| WO | WO-2014002483 A1 * | 1/2014 | ............. H01M 4/62 |
| WO | 2014/208180 A1 | 12/2014 | |
| WO | 2014/208239 A1 | 12/2014 | |
| WO | WO-2015037490 A1 * | 3/2015 | ........ H01M 10/0562 |

OTHER PUBLICATIONS

International Search Report dated May 17, 2016 issued in corresponding PCT/JP2016/061952 application (1 page).

* cited by examiner

METHOD FOR PRODUCING SULFIDE SOLID ELECTROLYTE AND SULFUR-BASED MATERIAL

FIELD OF THE INVENTION

The present invention relates to a method for producing a sulfide solid electrolyte and to a sulfur-based material.

BACKGROUND OF THE INVENTION

With rapid spread of information-related instruments, communication instruments and others such as personal computers, video cameras, cell phones and the like in recent years, development of batteries that are utilized as power sources for them is considered to be important. Among such batteries, lithium batteries are specifically noted from the viewpoint of realizing a high energy density.

Lithium batteries that are now on market use an electrolytic solution containing a combustible organic solvent, and therefore it is necessary to fit a safety device for preventing temperature elevation in short circuit and to make improvement in point of configurations and materials for prevention of short circuit. As opposed to this, a lithium battery in which the electrolytic solution is changed to a solid electrolyte layer so that the battery is solid as a whole is considered to be excellent in production cost reduction and productivity since a combustible organic solvent is not used in the battery and the safety device to be therein can be simplified. Further, as a solid electrolyte to be used in such a solid electrolyte layer, a sulfide solid electrolyte is known.

A sulfide solid electrolyte has a high Li ion conductivity and is therefore useful for increasing power of batteries, and various studies thereon have heretofore been made.

For example, PTL 1 discloses a $Li_2S$—$P_2S_5$—LiI-based sulfide solid electrolyte produced by mixing at a time raw materials of lithium sulfide, diphosphorus pentasulfide and lithium iodide. PTL 2 discloses a $Li_2S$—$P_2S_5$—LiI-based sulfide solid electrolyte produced by adding lithium iodide to a reaction product prepared by mixing and grinding lithium sulfide and diphosphorus pentasulfide; PTL 3 discloses a $Li_2S$—$P_2S_5$—LiBr-based sulfide solid electrolyte produced by adding lithium bromide to a reaction product prepared by mixing and grinding lithium sulfide and diphosphorus pentasulfide. In addition, PTL 2 says that the order of mixing the raw materials is not specifically defined. Further, NPL 1 discloses a $Li_2S$—$P_2S_5$—LiBr-based sulfide solid electrolyte produced by adding diphosphorus pentasulfide to a mixture prepared by mixing lithium sulfide and lithium bromide.

PTL 4 and PTL 5 each disclose a $Li_2S$—$P_2S_5$—LiI—LiBr-based sulfide solid electrolyte produced by mixing at a time raw materials of lithium sulfide, diphosphorus pentasulfide, lithium iodide and lithium bromide.

CITATION LIST

Patent Literature

PTL 1: JP 2012-048971 A
PTL 2: JP 2013-201110 A
PTL 3: WO2014/010169
PTL 4: WO2014/208180
PTL 5: WO2014/208239

Non-Patent Literature

NPL 1: Mater Renew Sustain Energy (2014)

SUMMARY OF INVENTION

Technical Problem

However, the sulfide solid electrolytes described in PTLs 1 to 3 and NPL 1 could not have a sufficient Li ion conductivity.

On the other hand, the $Li_2S$—$P_2S_5$—LiI—LiBr-based sulfide solid electrolyte described in PTL 4 and PTL 5 could have an increased ionic conductivity than before, but the sulfide solid electrolyte of this system has a problem in that production thereof takes a long time.

The present invention has been made in consideration of the situation as above, and its object is to provide a method for producing a $Li_2S$—$P_2S_5$—LiI—LiBr-based sulfide solid electrolyte capable of significantly shortening the production time, and to provide a sulfur-based material that can be used in the production method for the sulfide solid electrolyte.

Solution to Problem

The present inventors have assiduously studied for the purpose of solving the above-mentioned problems and, as a result, have found that, by mixing and grinding lithium sulfide and lithium bromide followed by adding diphosphorus pentasulfide and lithium iodide thereto and reacting them, the production time for a sulfide solid electrolyte containing a lithium element, a sulfur element, a phosphorus element, an iodine element and a bromine element can be greatly shortened.

The present invention has been completed on the basis of such findings.

Specifically, the present invention provides the following [1] to [8].

[1] A method for producing a sulfide solid electrolyte containing a lithium element, a sulfur element, a phosphorus element, an iodine element and a bromine element, which includes mixing and grinding lithium sulfide and lithium bromide, followed by adding phosphorus sulfide and lithium iodide thereto and reacting them.

[2] The method for producing a sulfide solid electrolyte according to the above [1], wherein in powder X-ray diffractometry using a CuKα ray of the ground mixture prepared by mixing and grinding lithium sulfide and lithium bromide, a diffraction peak derived from lithium bromide is not observed.

[3] The method for producing a sulfide solid electrolyte according to the above [1] or [2], wherein in powder X-ray diffractometry using a CuKα ray of the ground mixture prepared by mixing and grinding lithium sulfide and lithium bromide, a diffraction peak derived from lithium sulfide is observed.

[4] The method for producing a sulfide solid electrolyte according to any of the above [1] to [3], wherein the ground mixture prepared by mixing and grinding lithium sulfide and lithium bromide contains a solid solution of lithium sulfide and lithium bromide.

[5] The method for producing a sulfide solid electrolyte according to any of the above [1] to [4], wherein the grinding and the reacting are carried out in the same organic solvent.

[6] A sulfur-based material containing a lithium element, a sulfur element and a bromine element, which gives a diffraction peak derived from lithium sulfide but does not give a diffraction peak derived from lithium bromide in the powder X-ray diffractometry thereof using a CuKα ray.

[7] The sulfur-based material according to the above [6], which does not give any other diffraction peak than the diffraction peak derived from lithium sulfide.

[8] A method for producing a sulfide solid electrolyte containing a lithium element, a sulfur element, a phosphorus element, an iodine element and a bromide element, which includes reacting the sulfur-based material of the above [6] or [7], phosphorus sulfide and lithium iodide.

Advantageous Effects of Invention

According to the present invention, there can be provided a method for producing a sulfide solid electrolyte having a high Li ion conductivity in which the production time can be greatly shortened, and a sulfur-based material that can be used in the method for producing a sulfide solid electrolyte.

DESCRIPTION OF EMBODIMENTS

[Method for Producing Sulfide Solid Electrolyte]

The method for producing a sulfide solid electrolyte containing a lithium element, a sulfur element, a phosphorus element, an iodine element and a bromine element includes (a step of) mixing and grinding lithium sulfide and lithium bromide followed by adding phosphorus sulfide and lithium iodide thereto and reacting them.

Here, each step in the present invention may include any other steps than those described in this description, and does not exclude them.

Also in the present invention, a sulfide solid electrolyte whose X-ray diffraction pattern in X-ray diffractometry is a halo pattern that does not show substantially any other peak than the peaks derived from raw materials is referred to as "sulfide glass". On the other hand, a sulfide solid electrolyte that gives a peak derived from a sulfide solid electrolyte is referred to as "sulfide glass ceramic". In these, the presence or absence of peaks derived from raw materials are not taken into consideration.

The present invention is described in detail hereinunder.

In the method for producing a sulfide solid electrolyte of the present invention, first, lithium sulfide and lithium bromide are mixed and ground.

As the lithium sulfide ($Li_2S$), any one is employable with no specific limitation, but one having a high purity is preferred. Lithium sulfide may be produced, for example, according to the method described in JP 7-330312 A, JP 9-283156 A, JP 2010-163356 A, or Japanese Patent Application 2009-238952 (JP 2011-84438 A).

Specifically, in a hydrocarbon-based organic solvent, lithium hydroxide and hydrogen sulfide are reacted at 70° C. to 300° C. to give lithium hydrosulfide, then the resultant reaction liquid is desulfhydrated to give lithium sulfide (JP 2010-163356 A).

Alternatively, lithium hydroxide and hydrogen sulfide may be reacted at 10° C. to 100° C. in a water solvent to give lithium hydrosulfide, then the resultant reaction liquid is desulfhydrated to give lithium sulfide (Japanese Patent Application 2009-238952 (JP 2011-84438 A).

In the lithium sulfide, preferably, the total content of lithium salts of sulfur oxides is 0.15% by mass or less, more preferably 0.1% by mass or less, and also preferably, the content of lithium N-methylaminobutyrate is 0.15% by mass or less, more preferably 0.1% by mass or less. When the total content of lithium salts of sulfur oxides is 0.15% by mass or less, the sulfide glass to be obtained using the lithium sulfide as a raw material can be a glassy electrolyte (completely amorphous substance). On the other hand, when the total content of lithium salts of sulfur oxides is more than 0.15% by mass, the sulfide glass to be obtained using the lithium sulfide as a raw material may be a crystallized substance from the first.

In addition, when the content of lithium N-methylaminobutyrate to be contained in lithium sulfide is 0.15% by mass or less, cycle performance of lithium ion batteries produced using the lithium sulfide can be prevented from being degraded due to the degraded product of lithium N-methylaminobutyrate.

Using lithium sulfide where the impurities are reduced as above, a sulfide solid electrolyte having a high Li ion conductivity can be obtained.

In the case where lithium sulfide is produced based on the above-mentioned JP 7-330312 A and JP 9-283156 A, the lithium sulfide contains lithium salts of sulfur oxides and therefore purification thereof is preferred.

On the other hand, lithium sulfide produced according to the method for producing lithium sulfide described in JP 2010-163356 A, the content of lithium salts of sulfur oxides is extremely small, and therefore can be used without purification.

A preferred purification method is, for example, the purification method described in WO2005/40039. Specifically, lithium sulfide prepared in the manner as above is washed with an organic solvent at a temperature of 100° C. or higher.

The raw material, lithium hydroxide may remain in the lithium sulfide, but the remaining amount thereof is preferably small. The content of lithium hydroxide contained in the lithium sulfide is preferably 0.5% by weight or less, more preferably 0.3% by weight or less, even more preferably 0.1% by weight or less. When the content is 0.5% by weight or less, the Li ion conductivity of the resultant sulfide solid electrolyte can increase.

The lower limit of the lithium hydroxide content in the lithium sulfide is not specifically limited, and may be, for example, 0.001% by weight or so.

The specific surface area of the lithium sulfide is preferably 8.0 $m^2/g$ or more, more preferably 10.0 $m^2/g$ or more, even more preferably 12.0 $m^2/g$ or more. The upper limit of the specific surface area is not specifically limited, and is generally 50 $m^2/g$ or less.

The specific surface area of the lithium sulfide may be measured, for example, according to a BET method using a gas adsorption apparatus (AUTOSORB 6, manufactured by Sysmex Corporation). For the BET method, nitrogen gas may be used (nitrogen method), or krypton gas may be used (krypton method). In the case where the specific surface area is small, in general, a krypton method may be used for the measurement.

The pore volume of the lithium sulfide may be measured using the same apparatus as that for measurement of the specific surface area, and one calculated through interpolation in 0.99 from the measurement point at a relative pressure $P/P_0$ of 0.99 or more may be used. The lower limit for measurement by the apparatus is 0.001 ml/g. The pore volume of the lithium sulfide is preferably 0.01 ml/g or more. The upper limit of the pore volume is not specifically limited and is generally 1.0 ml/g or less.

The purity of the lithium sulfide may be measured, for example, according to potentiometric titration.

As the lithium bromide, any one produced industrially and sold may be used without any specific limitation.

The proportion of LiBr to the total of the lithium sulfide ($Li_2S$) and the lithium bromide (LiBr) (LiBr/$Li_2S$+LiBr) is not specifically limited, and any arbitrary proportion may be employed. From the viewpoint of obtaining a sulfide solid electrolyte having a high Li ion conductivity, the proportion of LiBr is preferably 10 mol % to 40 mol %, more preferably 15 mol % to 30 mol %, even more preferably 20 mol % to 25 mol %.

The ground mixture prepared by mixing and grinding the lithium sulfide and the lithium bromide preferably contain a solid solution of lithium sulfide and lithium bromide formed from the lithium sulfide and the lithium bromide.

Here, the solid solution is generally meant to indicate such a matter where two or more kinds of metal elements dissolve together to form a uniform solid phase as a whole.

In powder X-ray diffractometry using a CuKα ray of the ground mixture prepared by mixing and grinding the lithium sulfide and the lithium bromide, preferably, the mixture does not give a diffraction peak derived from lithium bromide.

On the other hand, in powder X-ray diffractometry using a CuKα ray of the ground mixture prepared by mixing and grinding the lithium sulfide and the lithium bromide, preferably, the mixture may give a diffraction peak derived from lithium sulfide.

The diffraction peak derived from lithium bromide appears at around $2\theta=28.1°$, $32.5°$, $46.7°$ and $55.4°$, and the diffraction peak derived from lithium sulfide appears at around $2\theta=26.8°$, $31.0°$, $44.6°$ and $52.8°$.

The method of mixing and grinding the lithium sulfide ($Li_2S$) and the lithium bromide (LiBr) is not specifically limited, but is preferably a method of circulating the substances between a grinding tank such as a bead mill or the like and a stirring tank (also referred to as a reaction tank) among a mechanical milling method (hereinafter mechanical milling may be referred to as "MM" and mechanical milling method may be referred to as "MM method) to be mentioned below and a slurry method.

Specifically, a step of reacting $Li_2S$ and LiBr with grinding in an organic solvent, and a step of reacting $Li_2S$ and LiBr optionally with stirring in an organic solvent are alternately carried out.

For example, in a grinder, $Li_2S$ and LiBr are reacted with grinding in an organic solvent to prepare a ground mixture thereof, and separately, in a reactor, $Li_2S$ and LiBr are reacted optionally with stirring in an organic solvent to prepare a ground mixture thereof, and $Li_2S$ and LiBr being reacted are circulated between the grinder and the reactor.

The time to be taken for the grinding may be preferably 50 hours or less, more preferably 20 hours or less, even more preferably 10 hours or less.

In this step, next, phosphorus sulfide ($P_2S_5$) and lithium iodide (LiI) are added to and reacted with the ground mixture of the above $Li_2S$ and LiBr to give a sulfide glass.

The above phosphorus sulfide and the lithium iodide may be any ones industrially produced and sold, and may be used with no specific limitation.

The proportion of each raw material in all the raw materials is not specifically limited. The proportion of $Li_2S$ to the total of $Li_2S$ and $P_2S_5$ preferably falls within a range of 68 mol % to 82 mol %, more preferably within a range of 72 mol % to 78 mol %, even more preferably within a range of 74 mol % to 76 mol %. This is because, by employing the composition near to the ortho composition to be mentioned below, a sulfide solid electrolyte having high chemical stability can be provided.

The total proportion of LiI and LiBr to all the raw materials is not specifically limited so far as it is a proportion capable of giving a desired sulfide solid electrolyte, and is, for example, preferably within a range of 5 mol % to 40 mol %, more preferably 10 mol % to 35 mol %, even more preferably 15 mol % to 25 mol %.

The proportion of LiBr to the total of LiI and LiBr (LiBr/LiI+LiBr) is not specifically limited, and any arbitrary proportion can be employed. The proportion of LiBr is not specifically limited, but is preferably a proportion capable of giving an Li ion conductivity nearly equal to or higher than that of the sulfide solid electrolyte produced in the same manner except that LiBr is substituted with LiI in the composition (sulfide solid electrolyte as a comparative object), and is more preferably a proportion capable of giving an Li ion conductivity higher than that of the sulfide solid electrolyte of the comparative object. The proportion of LiBr is, for example, within a range of 1 mol % to 99 mol %, and is preferably within a range of 5 mol % to 75 mol %.

In the present invention, preferably, the proportion of Li to all the raw materials is 5 mol % or more and 15 mol % or less, and the proportion of LiBr to all the raw materials is 5 mol % or more and 20 mol % or less. Also preferably, the proportion of the molar number of LiBr to the molar number of LiI is, for example, within a range of 1 to 2.

In the case where the sulfide solid electrolyte has a composition of $a((1-b)LiI \cdot bLiBr) \cdot (1-a)(cLi_2S \cdot (1-c)P_2S_5)$, a corresponds to the total proportion of LiI and LiBr, b corresponds to the proportion of LiBr and c corresponds to the proportion of $Li_2S$.

Examples of the method of reacting the ground mixture of $Li_2S$ and LiBr with phosphorus sulfide and lithium iodide include a melt quenching method, a mechanical milling method (MM method), a slurry method, etc. Above all, among the MM method and the slurry method described as the method of mixing and grinding $Li_2S$ and LiBr in the above, a method of circulating the substances between a grinding tank such as a bead mill or the like and a stirring tank is preferred.

These methods are described below.

(I) Melt Quenching Method

A melt quenching method is described in, for example, JP 6-279049 A and WO2005/119706. Specifically, predetermined quantities of raw materials are mixed in a mortar and formed into pellets, and the resultant pellets are put in a carbon-coated quartz tube and sealed up in vacuum. These are reacted at a predetermined reaction temperature, and then poured into ice to be rapidly cooled to give a sulfide glass.

The reaction temperature is preferably 400° C. to 1000° C., more preferably 800° C. to 900° C.

The reaction time is preferably 0.1 hours to 12 hours, more preferably 1 to 12 hours.

The quenching temperature for the reaction product is generally 10° C. or lower, preferably 0° C. or lower, and the cooling speed is generally 1 to 10000 K/sec or so, preferably 10 to 10000 K/sec.

(II) Mechanical Milling Method (MM Method)

An MM method is described, for example, in JP 11-134937 A, JP 2004-348972 A, and JP 2004-348973 A.

Specifically, predetermined quantities of raw materials are mixed in a mortar, and reacted for a predetermined period of time using various kinds of ball mills, etc., thereby giving a sulfide glass.

In the MM method using raw materials, the raw materials may be reacted at room temperature (25° C.). Consequently, the method has an advantage that the raw materials do not thermally decompose and a sulfide glass having a charge-in composition can be obtained.

Another advantage of the MM method is that the sulfide glass can be powdered simultaneously with its production.

For the MM method, various kinds of ball mills can be used, such as a rotary ball mill, a tumbling ball mill, a vibrating ball mill, a planetary ball mill, etc.

Regarding the condition of the MM method, for example, in the case of using a planetary ball mill, the revolution speed may be tens to hundreds revolutions/min, and the treatment time may be 0.5 hours to 100 hours.

As described in JP 2010-90003 A, balls having a different diameter may be used, as mixed, in the ball mill. As described in JP 2009-110920 A, and JP 2009-211950 A, an organic solvent may be added to raw materials to form a slurry, and the resultant slurry may be processed for MM treatment. As described in JP 2010-30889 A, the temperature inside the mill may be controlled during MM treatment. The raw material temperature in MM treatment is preferably controlled to be 60° C. or higher and 160° C. or lower.

(III) Slurry Method

A slurry method is described in WO2004/093099, and WO2009/047977.

Specifically, predetermined quantities of raw materials are reacted in an organic solvent for a predetermined period of time to give a sulfide glass.

Here, as described in JP 2010-140893 A, during the reaction, the slurry containing raw materials may be circulated between a bead mill and a reactor to promote the reaction.

As described in WO2009/047977, preferably, the raw material, lithium sulfide is previously ground for efficiently promoting the reaction. As described in Japanese Patent Application 2010-270191 (JP 2011-136899 A), the raw material, lithium sulfide may be immersed in a polar solvent having a dissolution parameter of 9.0 or more (for example, methanol, acetonitrile) for a predetermined period of time for increasing the specific surface area thereof.

The reaction temperature is preferably 20° C. of higher and 80° C. or lower, more preferably 20° C. or higher and 60° C. or lower. The reaction time is preferably 1 hour or more and 16 hours or less, more preferably 2 hours or more and 14 hours or less.

The amount of the organic solvent is preferably such that the raw material can be a solution or a slurry by addition of the organic solvent thereto. In general, the amount (total amount) of raw materials is, relative to 1 liter of an organic solvent, approximately 0.001 kg or more and 1 kg or less. Preferably, the amount is 0.005 kg or more and 0.5 kg or less, more preferably 0.01 kg or more and 0.3 kg or less.

The organic solvent is not specifically limited, and is preferably an aprotic organic solvent. The aprotic organic solvent includes an aprotic nonpolar organic solvent (for example, a hydrocarbon organic solvent), an aprotic polar organic compound (for example, an amide compound, a lactam compound, a urea compound, an organic sulfur compound, a cyclic organic phosphorus compound, etc.), etc. Above all, an aprotic nonpolar organic solvent is preferred, and a hydrocarbon organic solvent is especially preferred. A single solvent or a mixed solvent of these may be used favorably.

The hydrocarbon organic solvent is a solvent formed of carbon atoms and hydrogen atoms, and examples of the hydrocarbon organic solvent include a saturated hydrocarbon organic solvent, an unsaturated hydrocarbon organic solvent, an aromatic hydrocarbon organic solvent, etc.

Examples of the saturated hydrocarbon organic solvent include hexane, pentane, 2-ethylhexane, heptane, octane, decane, cyclohexane, methylcyclohexane, etc. Commercial products of the solvent include IP Solvent 1016 (manufactured by Idemitsu Kosan Co., Ltd.), IP Solvent 1620 (manufactured by Idemitsu Kosan Co., Ltd.), etc. One alone or two or more kinds of these may be used either singly or as combined.

Examples of the unsaturated hydrocarbon organic solvent include hexene, heptene, cyclohexene, etc.

Examples of the aromatic hydrocarbon organic solvent include toluene, xylene, ethylbenzene, decalin, 1,2,3,4-tetrahydronaphthalene, etc. Commercial products of the solvent include Ipsol 100 (manufactured by Idemitsu Kosan Co., Ltd.), Ipsol 150 (manufactured by Idemitsu Kosan Co., Ltd.), etc.

One alone or two or more kinds of hydrocarbon organic solvents may be used either singly or as combined.

The hydrocarbon organic solvent is preferably an aromatic hydrocarbon organic solvent, and is more preferably an aromatic hydrocarbon organic solvent represented by the following general formula (1):

$$\text{Ph-(R)}_n \tag{1}$$

wherein Ph represents an aromatic hydrocarbon group, R represents an alkyl group having 1 to 3 carbon atoms, and n represents an integer selected from 1 to 5.

The aromatic hydrocarbon group of Ph includes a substituted or unsubstituted aromatic hydrocarbon group having 6 to 30 ring forming carbon atoms. Specifically, the group includes a phenyl group, a naphthyl group, an anthracenyl group, a naphthacenyl group, etc. Above all, a phenyl group and a naphthacenyl group are preferred. Examples of the substituent include a methyl group, an ethyl group, etc., and above all, a methyl group is preferred.

Examples of the alkyl group having 1 to 3 carbon atoms of R include a methyl group, an ethyl group, an n-propyl group, an isopropyl group, etc. Above all, a methyl group and an ethyl group are preferred.

n is an integer selected from 1 to 5, and is preferably 1 or 2.

Examples of the aromatic hydrocarbon organic solvent represented by the above general formula (1) include toluene, xylene, ethylbenzene, etc., and toluene is preferred.

The water content in the hydrocarbon organic solvent is, in consideration of the reaction between water, and the raw materials and the sulfide solid electrolyte to be produced, preferably 50 ppm (by weight) or less. Water causes modification of the sulfide solid electrolyte by reaction, and worsens the properties of the sulfide solid electrolyte. Consequently, the water content is lower, the hydrocarbon organic solvent is better, and the water content in the hydrocarbon solvent is more preferably 30 ppm or less, even more preferably 20 ppm or less.

If desired, any other solvent may be added to the hydrocarbon organic solvent. Specifically, the other solvent includes ketones such as acetone, methyl ethyl ketone, etc.; ethers such as tetrahydrofuran, etc.; alcohols such as ethanol, butanol, etc.; esters such as ethyl acetate, etc.; halogenohydrocarbons such as dichloromethane, chlorobenzene, etc.

The production condition such as the temperature condition, the treatment time, the charge-in amount and others in the melt quenching method, the MM method and the slurry method may be adequately controlled depending on the facilities to be used.

As the method of reacting the ground powder of $Li_2S$ and LiBr with phosphorus sulfide and lithium iodide, an MM method or a slurry method is preferred from the viewpoint of cost reduction. Above all, use of a method of circulating the substances between the grinding tank such as the above-mentioned bead mill or the like and a stirring tank is more preferred.

The order of adding phosphorus sulfide and lithium iodide to the ground mixture is not specifically limited. Phosphorus sulfide and lithium iodide may be added at a time, or phosphorus sulfide may be added first and then lithium iodide may be added, or phosphorus sulfide may be added after lithium iodide has been added.

According to this process, the time to be taken for the reaction of the ground powder of lithium sulfide and lithium bromide with phosphorus sulfide and lithium iodide is preferably within 50 hours, more preferably within 20 hours, even more preferably within 10 hours.

Preferably, the grinding and the reaction are carried out in the same organic solvent.

The production method for a sulfide solid electrolyte of the present invention preferably includes a step of mixing and grinding lithium sulfide and lithium bromide, then adding phosphorus sulfide and lithium iodide thereto and reacting them, and after the step, a step of heat-treating the sulfide glass obtained in the previous step at a temperature of 150° C. or higher.

The heat treatment temperature in the heat treatment step is generally 150° C. or higher. Above all, the heat treatment temperature is preferably 170° C. or higher, more preferably 190° C. or higher. On the other hand, the upper limit of the heat treatment temperature is not specifically limited, and is preferably 300° C. or lower, more preferably 280° C. or lower.

The heat treatment time is not specifically limited so far as a desired sulfide solid electrolyte can be produced within the period of time, and is, for example, within a range of 1 minute to 24 hours, above all, preferably within a range of 1 minutes to 10 hours. The heat treatment is preferably carried out in an inert gas atmosphere (for example, Ar gas atmosphere) or a reduced pressure atmosphere (especially in vacuum). This is because the sulfide solid electrolyte can be prevented from being degraded (for example, oxidized) in the atmosphere. The heat treatment method is not specifically limited, and, for example, a method of using a firing furnace can be employed.

According to another embodiment of the production method for a sulfide solid electrolyte of the present invention, there can be provided a method for producing a sulfide solid electrolyte including (a step of) reacting a sulfur-based material to be described below, and phosphorus sulfide and lithium iodide.

As the method of reacting a sulfur-based material with phosphorus sulfide and lithium iodide, a method described for the method of reacting a ground mixture of lithium sulfide and lithium bromide with phosphorus sulfide and lithium iodide may be employed.

According to the step, the reaction time for a sulfur-based material with phosphorus sulfide and lithium iodide can be preferably within 50 hours, more preferably within 20 hours, even more preferably within 10 hours.

[Sulfur-Based Material]

The sulfur-based material of the present invention contains a lithium element, a sulfur element and a bromine element. The kinds of the elements constituting the sulfur-based material can be confirmed, for example, using an ICP emission spectrometer.

The raw materials for the sulfur-based material is not specifically limited so far as they are compounds containing a lithium element, a sulfur element and a bromine element. Lithium sulfide and lithium bromide are preferably used. These lithium sulfide and lithium bromide are the same as those described in the section of "method for producing sulfide solid electrolyte".

The sulfur-based material of the present invention gives a diffraction peak derived from lithium sulfide but does not give a diffraction peak derived from lithium bromide in the powder X-ray diffractometry thereof using a CuKα ray. Using the sulfur-based material of the present invention greatly shortens the production time for a sulfide solid electrolyte.

Preferably, the sulfur-based material does not give any other diffraction peak than the diffraction peak derived from lithium sulfide in the powder X-ray diffractometry thereof using a CuKα ray, from the viewpoint of realizing the advantageous effects of the present invention.

The sulfur-based material of the present invention can be produced, for example, by alternately carrying out a step of reacting lithium sulfide and lithium bromide with grinding in an organic solvent and a step of reacting lithium sulfide and lithium bromide in an organic solvent. Specifically, lithium sulfide and lithium bromide are reacted while grinding in an organic solvent in a grinder to prepare a ground mixture thereof, and separately, lithium sulfide and lithium bromide are reacted in an organic solvent in a reactor to prepare a ground mixture, and the lithium sulfide and the lithium bromide being reacted are circulated between the grinder and the reactor. In the reactor, the substances may be stirred for promoting the reaction.

[Sulfide Solid Electrolyte]

Next, the sulfide solid electrolyte obtained in the present invention is described.

The sulfide solid electrolyte obtained in the present invention contains a lithium element, a sulfur element, a phosphorus element, an iodine element and a bromine element. The kinds of the elements constituting the sulfide solid electrolyte can be confirmed using an ICP emission spectrometer.

Examples of the crystal structure of the sulfide solid electrolyte containing a lithium element, a sulfur element and a phosphorus element include an $Li_3PS_4$ crystal structure, an $Li_4P_2S_6$ crystal structure, an $Li_7PS_6$ crystal structure, an $Li_7P_3S_{11}$ crystal structure, an $Li_{4-x}Ge_{1-x}P_xS_4$ thio-LISICON Region II (0<X<1) type crystal structure, a crystal structure similar to the $Li_{4-x}Ge_{1-x}P_xS_4$ thio-LISICON Region II type crystal structure, etc. In X-ray diffractometry using CuKα ray, the $Li_3PS_4$ crystal structure gives diffraction peaks, for example, at around 2θ=17.5°, 18.3°, 26.1°, 27.3°, 30.0°; the $Li_4P_2S_6$ crystal structure gives diffraction peaks, for example, at around 2θ=16.9°, 27.1°, 32.5°, the $Li_7PS_6$ structure gives diffraction peaks, for example, at around 2θ=15.3°, 25.2°, 29.6°, 31.0°, the $Li_7P_3S_{11}$ crystal structure gives diffraction peaks, for example, at around 2θ=17.8°, 18.5°, 19.7°, 21.8°, 23.7°, 25.9°, 29.6°, 30.0°, the $Li_{4-x}Ge_{1-x}P_xS_4$ thio-LISICON Region II type crystal structure gives diffraction peaks, for example, at around 2θ=20.1°, 23.9°, 29.5°, the crystal structure similar to the $Li_{4-x}Ge_{1-x}P_xS_4$ thio-LISICON Region II type crystal structure gives diffraction peaks, for example, at around 2θ=20.2, 23.6°.

The sulfide solid electrolyte obtained in the present invention preferably gives peaks at 2θ=20.2°, 23.6° in the X-ray diffractometry thereof using a CuKα ray. Specifically, the sulfide solid electrolyte preferably has a crystal structure similar to the $Li_{4-x}Ge_{1-x}P_xS_4$ thio-LISICON Region II type structure. The crystal phase may be referred to as a high Li ion conduction phase. Here, the peak at 2θ=20.2° includes not only a peak strictly at 2θ=20.2° but also peaks within a range of 2θ=20.2°±0.5°. Depending on the crystal state, the peak position may move somewhat in the vicinity, and the peak is defined as above. Similarly, the peak at 2θ=23.6° includes not only a peak strictly at 2θ=23.6° but also peaks within a range of 2θ=23.6°±0.5°. The high Li ion conduction phase generally has peaks at 2θ=29.4°, 37.8°, 41.1°, 47.0° in addition to those at 2θ=20.2°, 23.6°. These peak positions may also move in the vicinity within a range of ±0.5°. In particular, the sulfide solid electrolyte preferably has only peaks of a high Li ion conduction phase, that is, preferably has a high Li ion conduction phase as a single phase. This is because the sulfide solid electrolyte of the type can be one having high Li ion conductivity.

The sulfide solid electrolyte obtained according to the present invention includes a sulfide glass and a sulfide glass ceramic, but is preferably a sulfide glass ceramic. The sulfide glass ceramic is a material produced by crystallizing a sulfide glass. Whether or not the electrolyte is a sulfide glass ceramic may be confirmed, for example, through X-ray diffractometry.

The sulfide solid electrolyte obtained according to the present invention is preferably composed of an ion conductor having Li, P and S, and LiI and LiBr. The ion conductor is not specifically limited and may be any one having Li, P and S. Above all, the ion conductor preferably has an ortho composition. This is because the ortho composition can provide a sulfide solid electrolyte having high chemical stability. Here, in general, ortho means one having a highest hydration degree among oxo-acids produced by hydration of a same oxide. In the present invention, a crystal composition where $Li_2S$ among sulfides mostly has been added is referred to as an ortho composition. For example, in a $Li_2S$—$P_2S_5$ system, $Li_3PS_4$ corresponds to an ortho composition. In the case of a $Li_2S$—$P_2S_5$ system sulfide solid electrolyte, the proportion of $Li_2S$ to $P_2S_5$ capable of forming an ortho composition is $Li_2S:P_2S_5$=75:25 by mol.

In the present invention, "having an ortho composition" includes not only a strict ortho composition alone but also compositions close thereto. Specifically, the wording indicates mainly the anion structure ($PS_4^{3-}$ structure) of the ortho composition. The proportion of the anion structure in the ortho composition is preferably 60 mol % or more relative to all the anion structures in an ion conductor, more preferably 70 mol % or more, even more preferably 80 mol % or more, still more preferably 90 mol % or more. The proportion of the anion structure in the ortho composition may be determined through Raman spectrometry, NMR, XPS or the like.

Preferably, the sulfide solid electrolyte obtained according to the present invention does not substantially contain $Li_2S$. This is because the sulfide solid electrolyte could be one with little hydrogen sulfide emission. $Li_2S$ reacts with water to give hydrogen sulfide. For example, when the proportion of $Li_2S$ in all the raw materials is large, $Li_2S$ often remains in the product. "Not substantially containing $Li_2S$" can be confirmed through X-ray diffractometry. Specifically, in the case where the sulfide solid electrolyte does not have peaks of $Li_2S$ (2θ=27.0°, 31.2°, 44.8°, 53.1°), it may be considered that the sulfide solid electrolyte does not substantially contain $Li_2S$.

Preferably, the sulfide solid electrolyte obtained according to the present invention does not substantially contain a crosslinked sulfur. This is because the sulfide solid electrolyte could be one with little hydrogen sulfide emission. "Crosslinked sulfur" is a crosslinked sulfur in a compound produced by reaction of $Li_2S$ and $P_2S_5$. For example, "Crosslinked sulfur" corresponds to a crosslinked sulfur in a structure $S_3P$—S—$PS_3$ formed by reaction of $Li_2S$ and $P_2S_5$. The crosslinked sulfur of the type readily reacts with water to generate hydrogen sulfide. For example, when the proportion of $Li_2S$ in all the raw materials is small, a crosslinked sulfur is readily formed. "Not substantially containing a crosslinked sulfur" can be confirmed through a measurement of Raman spectrometry. Specifically, in the case of a $Li_2S$—$P_2S_5$-based sulfide solid electrolyte, in general, a peak of a structure $S_3P$—S—$PS_3$ appears at 402 $cm^{-1}$. Consequently, it is desirable that the peak is not detected. In addition, a peak of a structure $PS_4^{3-}$ generally appears at 417 $cm^{-1}$. In the present invention, preferably, the intensity $I_{402}$ at 402 $cm^{-1}$ is smaller than the intensity $I_{417}$ at 417 $cm^{-1}$. More specifically, for example, the intensity $I_{402}$ is preferably 70% or less of the intensity $I_{417}$, more preferably 50% or less, even more preferably 35% or less.

Examples of the shape of the sulfide solid electrolyte obtained according to the present invention include granules. The mean particle size ($D_{50}$) of the granular sulfide solid electrolyte is, for example, preferably within a range of 0.1 μm to 50 μm. Here, the mean particle size ($D_{50}$) means a particle size to reach 50% of all the particles as sequentially integrated from the particles having a smallest particle size on the particle size distribution cumulative curve drawn with particles, and the volumetric distribution is, for example, the mean particle size that can be measured using a laser diffraction/scattering particle size distribution measuring device.

The sulfide solid electrolyte preferably has a high Li ion conductivity, and the Li ion conductivity thereof at room temperature is preferably $1.0 \times 10^{-4}$ S/cm or more, more preferably $1.0 \times 10^{-3}$ S/cm or more, even more preferably $1.2 \times 10^{-3}$ S/cm or more.

The sulfide solid electrolyte obtained according to the present invention can be used in any applications that require Li ion conductivity. Above all, the sulfide solid electrolyte is preferably used in batteries. The sulfide solid electrolyte may be used in a positive electrode layer, or in a negative electrode layer, or may be used in an electrolyte layer. Each layer may be produced according to a known method.

The positive electrode layer preferably contains a positive electrode active material, a sulfide solid electrolyte obtained according to the present invention, and a conductive assistant. In addition, the layer may contain a binder.

A substance into which lithium ion can be inserted and from which lithium ion can be released can be used as the positive electrode active material, and any substance known as a positive electrode active material in the field of batteries can be used as the positive electrode active material. Examples of the active material include oxides such as $V_2O_5$, $LiCoO_2$, $LiNiO_2$, $LiMnO_2$, $LiMn_2O_4$, $Li(Ni_a Co_b Mn_c)O_2$ (where 0<a<1, 0<b<1, 0<c<1, a+b+c=1), $LiNi_{1-Y}Co_YO_2$, $LiCo_{1-Y}Mn_YO_2$, $LiNi_{1-Y}Mn_YO_2$ (where 0≤Y<1), $Li(Ni_a Co_b Mn_c)O_4$ (0<a<2, 0<b<2, 0<c<2, a+b+ c=2), $LiMn_{2-Z}Ni_ZO_4$, $LiMn_{2-Z}Co_ZO_4$ (where 0<Z<2), $LiCoPO_4$, $LiFePO_4$, bismuth oxide ($Bi_2O_3$), bismuth plumbate ($Bi_2Pb_2O_5$), copper oxide (CuO), vanadium oxide ($V_6O_{13}$), $Li_xCoO_2$, $Li_xNiO_2$, $Li_xMn_2O_4$, $Li_xFePO_4$, $Li_xCoPO_4$, $Li_xMn_{1/3}Ni_{1/3}Co_{1/3}O_2$, $Li_xMn_{1.5}Ni_{0.5}O_2$ (where 0<X), etc. Other positive electrode active materials are also usable, for example, sulfides including an elemental substance sulfur (S), titanium sulfide ($TiS_2$), molybdenum sulfide ($MoS_2$), iron sulfide (FeS, $FeS_2$), copper sulfide (CuS), nickel sulfide ($Ni_3S_2$), lithium sulfide ($Li_2S$), organic disulfide compounds, carbon sulfide compounds, sulfur, etc. S and $Li_2S$ having a high theoretical capacity can be preferably used.

The conductive assistant may be any one having a conductive property, and for example, the conductivity thereof is preferably $1 \times 10^3$ S/cm or more, more preferably $1 \times 10^5$ S/cm or more.

The conductive assistant includes substances selected from carbon materials, metal powders and metal compounds, and mixtures thereof.

Specific examples of the conductive assistant include substances containing at least one element selected from the group consisting of carbon, nickel, copper, aluminum, indium, silver, cobalt, magnesium, lithium, chromium, gold, ruthenium, platinum, beryllium, iridium, molybdenum, niobium, osmium, rhodium, tungsten and zinc, and these are preferred. More preferred are an elemental substance carbon, and an elemental substance metal, a mixture or a compound including carbon, nickel, copper, silver, cobalt, magnesium, lithium, ruthenium, gold, platinum, niobium, osmium or rhodium that have high conductivity.

Specific examples of carbon materials include carbon black such as Ketjen black, acetylene black, Denka black, thermal black, channel black, etc., and graphite, carbon fibers, active carbon, etc. One alone or two or more of these may be used either singly or as combined.

Above all, acetylene black, Denka black and Ketjen black having high electron conductivity are preferred.

As the binder, one alone or two or more kinds of fluororesins such as polytetrafluoroethylene (PTFE), polyvinylidene fluoride (PVdF), fluororubber etc., thermoplastic resins such as polypropylene, polyethylene, etc., and ethylene-propylene-dienemer (EPDM), sulfonated EPDM, natural butyl rubber (NBR), etc. can be used either singly or as a mixture. In addition, as a water-based binder, a cellulosic or styrene butadiene rubber (SBR) dispersion in water or the like is also usable.

In the positive electrode layer, the proportion of the positive electrode active material, the sulfide solid electrolyte, the conductive assistant and others is not specifically limited, and may be any known proportion.

The thickness of the positive electrode layer is preferably 0.01 mm or more and 10 mm or less.

The positive electrode layer may be formed in any known method. For example, the layer may be formed according to a coating method, an electrostatic method (an electrostatic spray method, an electrostatic screen method, etc.).

The negative electrode layer preferably contains a negative electrode active material, the sulfide solid electrolyte produced according to the present invention, and a conductive assistant. The layer may also contain a binder.

A substance into which lithium ion can be inserted and from which lithium ion can be released can be used as the negative electrode active material, and any substance known as a negative electrode active material in the field of batteries can be used as the negative electrode active material.

Examples of the material include carbon materials, specifically artificial graphite, graphite carbon fibers, resin fired carbon, pyrolytic vapor grown carbon, coke, mesocarbon microbeads (MCMB), furfuryl alcohol resin fired carbon, polyacene, pitch carbon fibers, vapor-grown carbon fibers, natural graphite, and hardly-graphitizing carbon, etc., and their mixtures. Artificial graphite is preferred.

In addition, metal itself such as metal lithium, metal indium, metal aluminum, metal silicon or the like, as well as alloys prepared by combining these metals and other elements or compounds are also usable as a negative electrode material. Above all, silicon, tin and lithium metals are preferred, as having high theoretical capacity.

As the conductive assistant and the binder, those mentioned hereinabove for the positive electrode layer may be referred to.

The method of forming the negative electrode layer and the thickness thereof are the same as those for the positive electrode layer.

The electrolyte layer contains the sulfide solid electrolyte obtained according to the present invention, and may contain a binder, and may further contain any other electrolyte. As the binder, the same ones as those mentioned above for the positive electrode layer may be referred to.

The other electrolyte includes a polymer solid electrolyte, an oxide solid electrolyte, etc.

The polymer solid electrolyte is not specifically limited. Examples thereof include, as disclosed in JP 2010-262860 A, materials usable as polymer electrolytes, such as fluororesin, polyethylene oxide, polyacrylonitrile, polyacrylate, and their derivatives and copolymers, etc.

Examples of the fluororesin include those containing vinylidene fluoride (VdF), hexafluoropropylene (HFP), tetrafluoroethylene (TFE) or a derivative thereof or the like as a constituent unit. Specifically, there are mentioned homopolymers and tertiary polymers such as polyvinylidene fluoride (PVdF), polyhexafluoropropylene (PHFP), polytetrafluoroethylene (PTFE), etc., and secondary polymers such as a copolymer of VdF and HFP, etc.

As the oxide solid electrolyte, crystals having a perovskite structure, such as LiN, LISICONs, Thio-LISICONs, $La_{0.55}Li_{0.35}TiO_3$, etc., $LiTi_2P_3O_{12}$ having a NASICON-type structure, and electrolytes formed by crystallizing them are usable.

The electrolyte layer may be formed by applying a slurry that contains a sulfide solid electrolyte obtained according to the present invention, a binder and a solvent, or by an electrostatic screen printing method using a granular sulfide solid electrolyte.

Preferably, the sulfide solid electrolyte in the electrolyte layer is fused. Here, fusing means that sulfide solid electrolyte particles have partly melted and the melted part is integrated with other sulfide solid electrolyte particles.

The electrolyte layer may be a tabular form of a sulfide solid electrolyte. The present invention also includes the embodiment in which a part or all of the sulfide solid electrolyte particles may melt to form a tabular form.

The thickness of the electrolyte layer is preferably 0.001 mm or more and 1 mm or less.

In the battery, a collector is preferably used in addition to the positive electrode layer, the electrolyte layer and the negative electrode layer. As the collector, any known one is employable. For example, a layer formed by coating one reactive with the above-mentioned sulfide solid electrolyte, such as Au, Pt, Al, Ti, Cu or the like, with Au or the like may be used.

EXAMPLES

Next, the present invention is described specifically with reference to Examples, but the present invention is not whatsoever restricted by these Examples.

The Li ion conductivity of the sulfide solid electrolyte obtained in Examples is a value measured according to the method mentioned below.

[Measurement of Li Ion Conductivity ($\sigma$)]

The sulfide solid electrolyte obtained in Examples was formed into a shape having a cross section of 10 mm$\phi$ (cross-sectional area S=0.785 cm$^2$), and a height (L) of 0.1 to 0.3 cm to prepare a sample piece. From the top and the bottom of the sample piece, electrode terminals were taken, and Cole-Cole plot was obtained by measurement according to an alternate current impedance method (frequency range: 5 MHz to 0.5 Hz, amplitude: 10 mV). At around the right end of the arc observed in the high-frequency region, the real number part Z' ($\Omega$) at the point at which –Z" ($\Omega$) was the smallest was referred to as a bulk resistance R ($\Omega$) of the electrolyte, and according to the following equation, the Li ion conductivity $\sigma$ (mS/cm) was calculated.

$$R = \rho(L/S)$$

$$\sigma = 1/\rho$$

In measurement in the present invention, the lead distance was about 60 cm.

Production Example 1: Synthesis of Lithium Sulfide (Li$_2$S) According to Toluene Method 270 g of toluene (reagent manufactured by Hiroshima Wako Co., Ltd.) was put into a 600-ml separable flask in a nitrogen flow current, then subsequently 30 g of anhydrous lithium hydroxide (manufactured by The Honjo Chemical Corporation) was put thereinto, and kept at 95° C. with stirring at 300 rpm with a full-zone stirrer.

With introducing hydrogen sulfide (manufactured by Tomoe Shokai Co., Ltd.) into the slurry liquid obtained according to the above-mentioned reaction at a supply rate of 300 ml/min, the solution was heated up to 104° C. An azeotropic gas of water and toluene was continuously discharged out of the separable flask. The azeotropic gas was condensed in a condenser outside the system for dehydration. During this time, toluene of the same amount as the amount of toluene being evaporated out was continuously supplied so that the amount of the slurry liquid was kept constant.

The amount of water in the condensed liquid gradually reduced, and in 6 hours after hydrogen sulfide introduction, water distillation ended (the total water amount was 22 ml). During the reaction, solid was dispersed in toluene and kept stirred therein, and no water separated out from toluene layer.

Subsequently, hydrogen sulfide was changed to nitrogen, and introduced into the system at 300 ml/min for 1 hour.

Next, the slurry liquid was filtered. After the filtration, this was dried in vacuum at 200° C. to give lithium sulfide.

The purity of the resultant lithium sulfide was 97.7% by weight, the specific surface area thereof was 13.2 m$^2$/g, the pore volume thereof was 0.137 ml/g.

The purity of lithium sulfide was measured through potentiometric titration, the specific surface area was measured according to a nitrogen adsorption method (BET method), and the pore volume was measured according to a nitrogen adsorption method (BET method).

Example 1

(Mixing and Grinding of Li$_2$S and LiBr)

Figure 1:
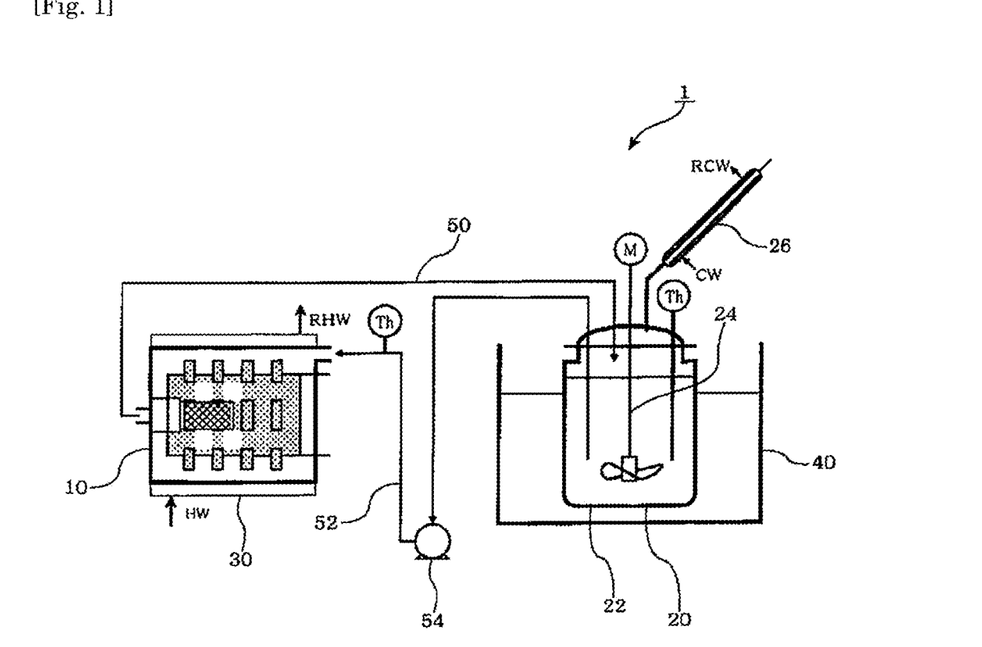
FIG. 1 is a view showing a production apparatus for use in Examples of the present invention.

An apparatus shown in FIG. 1 was used. The production apparatus 1 is equipped with a bead mill 10 for grinding and reacting raw materials, and a reactor 20 for reacting the raw materials. The reactor 20 is composed of a container 22 and a stirrer 24. The stirrer 24 is driven by a motor (M).

The bead mill 10 is provided with a heater 30, which circulates hot water around the mill 10. The reactor 20 is put in an oil bath 40. The oil bath 40 heats the raw materials and the solvent in the container 22 up to a predetermined temperature. The reactor 20 is equipped with a condenser tube 26 to cool and liquefy the vaporized solvent.

The bead mill 10 and the reactor 20 are connected via a first connecting tube 50 and a second connecting tube 52. The first connecting tube 50 transfers the raw materials and the solvent in the bead mill 10 to the reactor 20, and the second connecting tube 52 transfers the raw materials and the solvent in the reactor 20 to the bead mill 10. For circulating raw materials and others through the connecting tubes 50 and 52, a pump 54 (for example, a diaphragm pump) is arranged in the second connecting tube 52.

As the bead mill, Bead Mill LMZ015 manufactured by Ashizawa Finetech Ltd. was used, and 456 g of zirconia balls each having a diameter of 0.5 mm were charged therein. As the reactor, a 1.5-liter glass reactor equipped with a stirrer was used. The bead mill was provided with a circulation route to run through the reactor from one end to the other end thereof.

29.7 g of lithium sulfide produced in Production Example 1 and 15.0 g of anhydrous lithium bromide (manufactured by Sigma-Aldrich Co. LLC.) were weighed and put into in Schlenk bottle, and further 1200 ml of dehydrated toluene was added thereto, and while kept under nitrogen sealing, this was put into the reactor and the bead mill in the apparatus shown in FIG. 1.

The slurry put into the bead mill was circulated at a flow rate of 400 ml/min using the pump, and the bead mill was started to be driven, and thereafter 7.2 ml of dehydrated dibutyl ether was added thereto. Hot water was circulated in a mode of external circulation so that the liquid temperature could be kept at 60° C., and the bead mill body was thus driven for 6 hours at a peripheral speed of 8 m/sec to mix and grind the material to give a slurry.

A part of the resultant slurry was taken out, dried in vacuum, and a dry powder was collected. The collected matter was analyzed through XRD spectrometry, in which the diffraction peak of lithium sulfide remained but the diffraction peak of lithium bromide disappeared.

(Preparation of Sulfide Glass Using Ground Mixture of Li$_2$S and LiBr)

15.4 g of lithium iodide (manufactured by Sigma-Aldrich Co. LLC.) and 47.9 g of diphosphorus pentasulfide (manufactured by Sigma-Aldrich Co. LLC.) were added to the slurry obtained in the above. Subsequently, the contents were circulated at a flow rate of 400 ml/min using the pump, and the bead mill was started to be driven. Hot water was circulated in a mode of external circulation so that the liquid temperature was kept at 60° C., and the bead mill body was thus driven at a peripheral speed of 8 m/sec. During the driving, a part of the slurry was sampled at intervals of a few hours, and analyzed through powder X-ray diffractometry using an X-ray diffractometer (XRD) (SmartLab Apparatus, manufactured by Rigaku Corporation). The resulting XRD spectrum was investigated, in which, however, any diffraction peaks of the raw materials were not seen, and disappearance of the raw materials was thereby confirmed. The reaction was finished in 8 hours.

(Production of $Li_2S$—$P_2S_5$—LiI—LiBr-Based Sulfide Solid Electrolyte)

2 g of the powder after the reaction was collected in nitrogen, and heat-treated at 200° C. for 2 hours in vacuum to give a sulfide glass ceramics, a $Li_2S$—$P_2S_5$—LiI—LiBr-based sulfide solid electrolyte. The ion conductivity of the resultant sulfide solid electrolyte was $1.45 \times 10^{-3}$ S/cm.

Comparative Example 1

29.7 g of lithium sulfide produced in Production Example 1, 15.0 g of lithium bromide (manufactured by Sigma-Aldrich Co., LLC.), 15.4 g of lithium iodide (manufactured by Sigma-Aldrich Co., LLC.), 47.9 g of diphosphorus pentasulfide (manufactured by Sigma-Aldrich Co., LLC.), and 1200 ml of dehydrated toluene were put in a Schlenk bottle, and put in the apparatus of FIG. 1 all together. The amount of the beads and the circulation route were the same as in Example 1.

The slurry put into the bead mill was circulated at a flow rate of 400 ml/min using the pump, and after the bead mill had been started to be driven, 7.2 ml of dehydrated dibutyl ether was added. Hot water was circulated in a mode of external circulation so that the liquid temperature was kept at 60° C., and the bead mill body was thus driven at a peripheral speed of 8 m/sec.

During the driving, a part of the slurry was sampled at intervals of a few hours, and analyzed through powder X-ray diffractometry. The resulting XRD spectrum was investigated, in which, however, diffraction peaks of the raw materials were not seen, and disappearance of the raw materials was thereby confirmed. The reaction took 25 hours.

Reference Example 1

Figure 2:
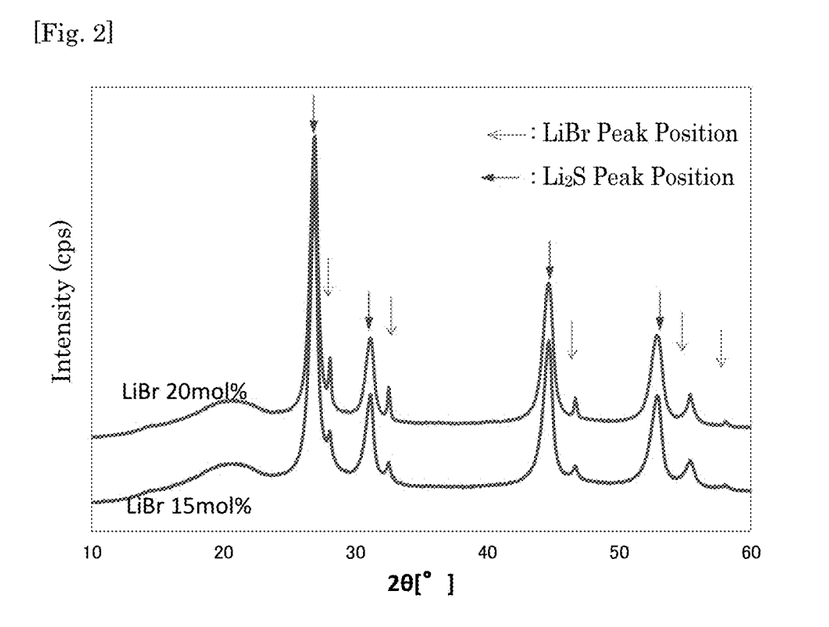
FIG. 2 is an X-ray diffraction spectrum of a ground mixture obtained in Reference Example 1 and Reference Example 2.

1.19 g of lithium sulfide produced in Production Example 1, and 0.81 g of lithium bromide (manufactured by Sigma-Aldrich Co., LLC.) were weighed and put into a 45-cc zirconia pot in an argon atmosphere. Further, 500 4-mmϕ zirconia balls (about 100 g) were put into the same pot, and sealed up. Accordingly, the atmosphere inside the pot was nitrogen. The pot was set in a planetary ball mill (Model Number P-7, manufactured by Frisch Japan Co., Ltd.), and ground at 500 rpm for 10 hours to collect a white powder. The XRD spectrum of the collected substance was analyzed, and as shown in FIG. 2, there remained diffraction peaks of the raw materials of both lithium sulfide and lithium bromide.

Reference Example 2

The raw materials were ground in the same manner as in Reference Example 1, except that 1.35 g of lithium sulfide and 0.65 g of lithium bromide were used. The XRD spectrum of the collected substance was analyzed, and as shown in FIG. 2, there remained diffraction peaks of the raw materials of both lithium sulfide and lithium bromide.

As described above, in Comparative Example 1 where the raw materials were put into the reactor and reacted all at a time, the reaction took 25 hours, but in Example 1 where lithium sulfide and lithium bromide were mixed and ground, and then phosphorus sulfide and lithium iodide were added thereto and reacted, the reaction time was 8 hours. Thus, in the latter, the reaction time was greatly shortened.

INDUSTRIAL APPLICABILITY

The sulfide solid electrolyte obtained according to the present invention is favorable as a constituent material of batteries, such as a solid electrolyte layer, etc.

REFERENCE SIGNS LIST

1 Production Apparatus
10 Bead Mill
20 Reactor
22 Container
24 Stirrer
26 Condenser Tube
30 Heater
40 Oil Bath
50 First Connecting Tube
52 Second Connecting Tube
54 Pump

The invention claimed is:

1. A method for producing a sulfide solid electrolyte containing a lithium element, a sulfur element, a phosphorus element, an iodine element and a bromine element, which comprises:
    mixing and grinding lithium sulfide and lithium bromide by a slurry method in the presence of an organic solvent resulting in a ground mixture with no lithium bromide,
    wherein in powder X-ray diffractometry using a CuKa ray of the ground mixture prepared by mixing and grinding lithium sulfide and lithium bromide, a diffraction peak derived from lithium bromide is not observed,
    followed by adding phosphorus sulfide and lithium iodide thereto and reacting them to for form a powder, and
    heating the resultant powder to provide a sulfide solid electrolyte.

2. The method for producing a sulfide solid electrolyte according to claim 1, wherein the ground mixture of lithium sulfide and lithium bromide contains a solid solution of lithium sulfide and lithium bromide.

3. The method for producing a sulfide solid electrolyte according to claim 1, wherein the grinding and the reacting are carried out in the same organic solvent.

4. The method for producing a sulfide solid electrolyte according to claim 1, wherein the phosphorus sulfide and lithium iodide is reacted with the ground mixture by adding the phosphorus sulfide and lithium iodide to the ground mixture.

* * * * *